United States Patent Office 3,453,523
Patented July 1, 1969

3,453,523
LOAD ENERGIZING CIRCUIT INCLUDING GATING MEANS CONTROLLED BY CROSS-FIRE SIGNALS AND RAMP-SHAPED TIMING SIGNALS
Donald G. Fair, Belvidere, and Bertil T. Anderson, Rockford, Ill., assignors to Sundstrand Corporation, a corporation of Delaware
Filed Aug. 10, 1965, Ser. No. 478,701
Int. Cl. H02m 1/08; H02p 5/00
U.S. Cl. 321—5                                    19 Claims

ABSTRACT OF THE DISCLOSURE

A control circuit for energizing a DC motor load from a three-phase AC source. Each phase of AC is coupled to a pair of reverse poled SCR's which pass up to 120° of the AC waveform, in either polarity, to the DC motor. Timing circuits for gating the SCR's clip and integrate each phase of AC to generate nonsymmetrical ramp signals which are compared with DC signals having an amplitude proportional to an error input. In the absence of an input, all SCR's are briefly gated to pass opposite polarity cross-fire pulses.

---

This invention relates to a control circuit, and, more particularly, to a circuit with a negligible response time for generating a trigger signal for a controlled rectifier.

The use of controlled rectifiers has increased markedly since the introduction of solid state devices. Circuits are known, responsive to an input or control signal, for utilizing such rectifiers to provide a bi-directional, variable amplitude output as in a speed and direction control for an electric motor. Such circuits have been adequate for control of motors available in the past, which generally have a high inertia. Recently, however, there has become available a DC motor with very low inertia and fast response time. The motor is capable of operation in high speed servo-drive systems where high inertia motors are unsatisfactory. An example of such a system is the drive for an automatic, precision machine tool. It is common with machine tools ot use hydraulic drives which do not add materially to the inertia of the drive element and which may be controlled as to rate and position rapidly and with a high degree of precision. However, the trigger signal generating circuits used in the past have an inherent time lag which is greater than the response time of the low inertia motor and prevent utilization of its full capabilities.

Furthermore, when highly accurate control is necessary, the control system must have a minimum dead band, i.e., the range of input signal with which the drive does not move. The minimum input signal which would be required to produce a motor torque just sufficient to overcome the friction of the motor and connected drive system would represent the dead band of the motor control circuit.

It is a principal object of this invention to provide a trigger signal generator for controlled rectifiers, which has no appreciable time delay.

Another object of the invention is the provision of a high speed, precision servo-drive system.

A further object of this invention is the provision of a control circuit for selectively gating up to substantially 120° of a power waveform from a three phase power source to a DC motor.

Yet another object is the provision of a controlled rectifier trigger circuit which is insensitive to noise on the power line. More specifically, a ramp signal is derived from the power sine wave and used as a reference for the trigger generator. The signal is clamped at a low voltage level, eliminating high frequency noise pulses which could cause triggering of the rectifiers at the wrong time.

Still a further object is the provision of a control circuit that generates pulses for gating pairs of opposite poled unidirectional condition means, as SCR's, which are coupled between each phase of a three phase power source and a DC motor. Three separate driving waveforms are derived from the power waveforms present in each phase of the three phase source. Adjustable biasing means are also provided which energize the control circuit during a predetermined portion of the driving waveform, thereby forming the pulses needed to control the conduction means. The input signal changes the magnitude of the bias in order to control the time at which the pulses are formed, in turn controlling the total amount of current gated to the motor. The biasing means also allows cross fire pulses to be automatically generated in the absence of an input signal.

Another object is the provision of a driving waveform in the shape of a cosine wave which is complementary to the sine wave power waveform coupled to the unidirectional conduction means, producing a linear relationship between the magnitude of the input signal and the amount of power gated to the motor.

Yet a further object is the provision of a control circuit that prevents two unidirectional conduction means coupled in opposite directions from being triggered at the same time when the input signal quickly changes polarity. When the error signal has a large fixed magnitude, the control circuit continuously gates unidirectional current to the DC motor in order to provide a short response time.

Another feature is the provision of a motor control circuit that provides smooth deceleration of the DC motor by delaying the time at which a gating means is triggered.

Still a further object is the provision of a safety network which automatically limits the current through the armature of the DC motor to any predetermined percentage of rated current.

Further features and advantages will readily be apparent from the following specification and from the drawings in which:

FIGURES 2 to 7 illustrate waveforms found in various parts of the circuit of FIGURE 1, and in which:

FIGURE 2 shows the power waveforms from the three phase power source;

FIGURE 3 shows the square wave output from the diodes in the driving means;

FIGURE 4 shows the ramp shaped driving waveform coupled to the bases of the transistors in the pulse forming means;

FIGURE 5 shows a square wave generated by the pulse forming means;

FIGURE 6 shows the spike coupled to the gating input of the SCR's;

FIGURE 7 shows the cross fire power spikes coupled to the DC motor;

Figure 1:
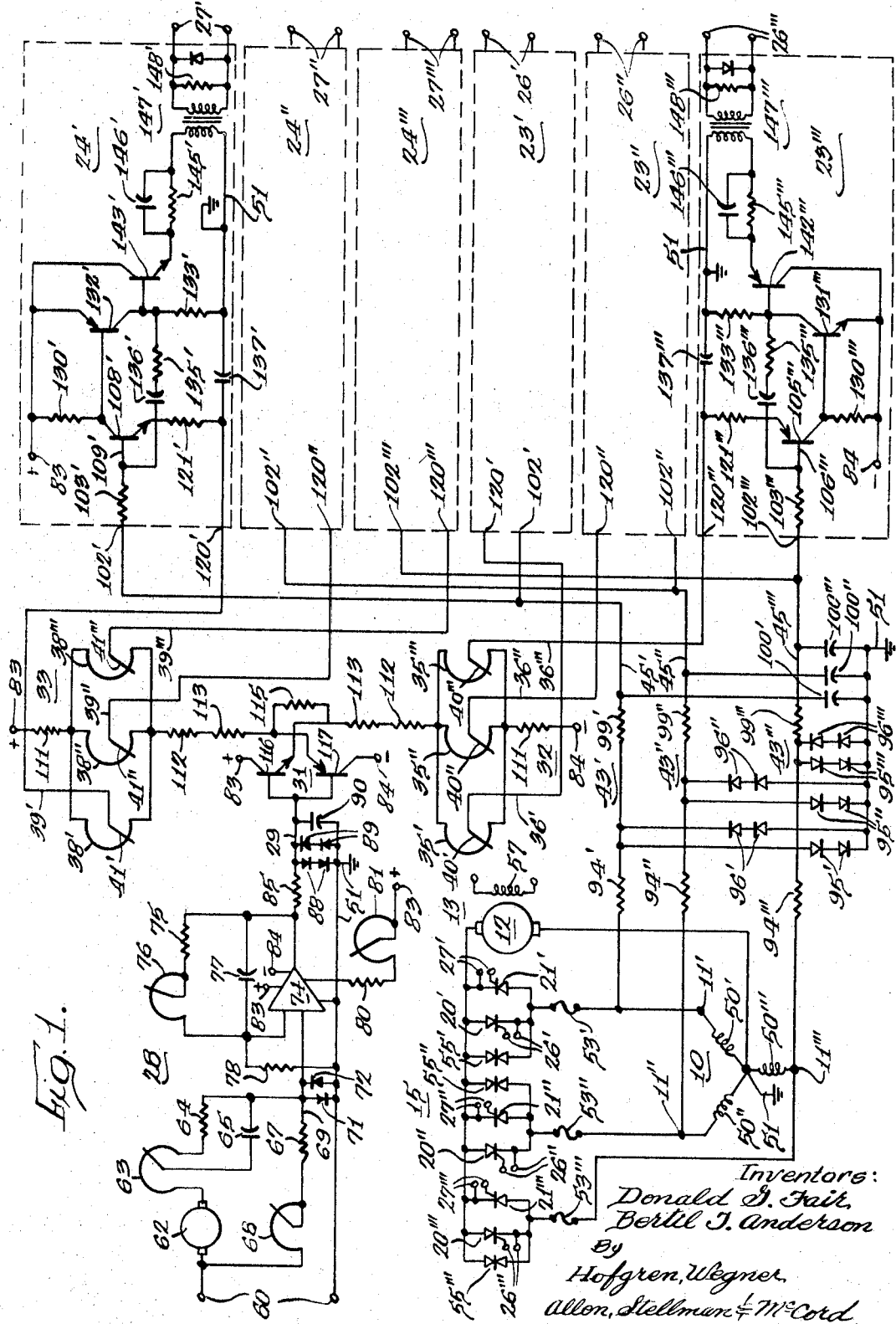
FIGURE 1 is a schematic diagram of a preferred embodiment of the invention.

While an illustrative embodiment of the invention is shown in the drawings and will be described herein, it should be understood that the invention is capable of embodiment in many different forms, and the present disclosure is to be considered as an exemplification of the principles of the invention and is not intended to limit the invention to the embodiment illustrated. Throughout the specification, values and type designations will be given for the components in order to disclose a complete, operative embodiment of the invention. However, it should be understood that such values and types are merely representative and are not critical unless specifically so stated. The scope of the invention will be pointed out in the appended claims.

In accordance with the applicants' invention, a DC motor is coupled to a source of three phase AC power through a gating means, e.g., pairs of oppositely poled silicon controlled rectifiers (SCR's), that pass current when triggered by a pulse. The control circuit that produces this pulse for gating the SCR's is controlled by an input signal that is present only when the motor is to be energized. The pulses generated allow a maximum of approximately 120° of a power waveform to be passed through a single SCR to the load. In order to provide the necessary degree of control, each phase of the three phase source is able to pass 120° of the waveform to the motor, thereby allowing a continuous unbroken unidirectional current to flow when so desired. A control circuit which allows less of each power waveform to be gated is less efficient and the system is less accurate.

Applicants' control circuit is normally adjusted to allow all of the gating means to conduct current for a small portion of each cycle. This produces power spikes, called "cross fire," each having slightly less power than that necessary to overcome friction, for reducing the dead band of the system. When an input or error control signal is received, an amount of power that is in direct linear proportion to the magnitude of the error signal is gated to the motor.

In order to control accurately the exact point at which the SCR's will conduct, the control circuit generates extremely stable low level signals which are used as a reference.

*General operation*

Figure 2:
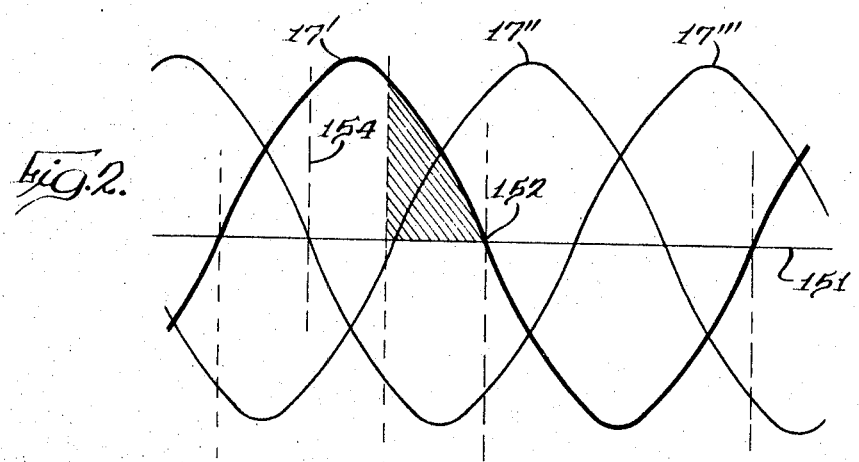

Turning now to FIGURE 1, a source of three phase power 10 having terminals 11', 11", and 11''' is coupled across an armature 12 of a DC motor 13 by gating means 15. Three phase energy with a power waveform 17', 17", and 17''', each displaced 120° from the adjacent power waveforms, are available, as seen in FIGURE 2, at respective terminals 11', 11", and 11'''. Throughout the specification, reference numerals with the same number of primes all refer to the same phase of power available from the three phase AC source 10.

The gating means 15 includes pulse actuated unidirectional conduction means, as a silicon controlled rectifier (SCR). SCR's 20 are each respectively coupled to one phase of the three phase source 10, and are poled to pass current in a "forward" direction, i.e., motor armature 12 turns in a forward direction when these SCR's are conducting. SCR's 21 are all poled in a reverse direction and are each respectively coupled to one phase of source 10. The novel control circuit disclosed hereinafter generates pulses for gating an adjustable portion of the power waveforms 17 to the motor 13 by causing the SCR's 20 or 21 to begin conduction at a variable point in each cycle, allowing a maximum of 120° of a power waveform to be coupled to a load through any one SCR.

In order to gate a forward poled SCR 20 or a reverse poled SCR 21, forward pulse forming means 23 and reverse pulse forming means 24 are provided for each phase of the three phase power source 10. Each of the forward pulse forming means 23 has an output line 26 which is directly coupled to the corresponding gate input of the forward poled SCR's 20 for each phase of the source. Similarly, each of the reverse pulse forming means 24 has an output line 27 directly coupled to the gate of the reverse poled SCR's 21 for each phase of the source 10. The output lines 26 and 27 have a pulse thereon which actuates the SCR's to allow the power waveform 17 which is at that instant coupled thereto to be passed to the motor armature 12.

The pulse forming means 23 and 24 are controlled in accordance with the presence or absence of a control signal from a control signal source 28. The control signal on line 29 of source 28 has a polarity that indicates the direction motor 13 is to turn, and a magnitude that indicates the desired motor speed, i.e., which determines the amount of current to be gated to the motor. Line 29 is coupled to an emitter follower 31 which is a portion of a forward bias means 32 and a reverse bias means 33.

A plurality of potentiometers 35 having individual output lines 36 for each phase of source 10 are connected in the circuit of the forward bias means 32. The output lines 36 have a bias output signal thereon adjustable throughout an "off" and "on" range of magnitudes. A plurality of potentiometers 38 having individual output lines 39 are provided in the circuit of the reverse bias means 33. The bias output signals on lines 39 are similarly adjustable throughout an "off" and "on" range of magnitudes.

The bias output signals on lines 36 and 39 are normally manually adjusted for a desired fixed value (in the absence of a control signal on line 29) by means of individual wiper arms 40 and 41 for potentiometers 35 and 38, respectively. The emitter follower 31 causes the current through each potentiometer to vary in accordance with the polarity and magnitude of a signal on line 29, in a manner to be described in detail hereinafter. The varying current causes the individual output lines 36 and 39 to have a bias output signal which varies, about the fixed value, in the same direction as the polarity of the signal on line 29.

Figure 4:
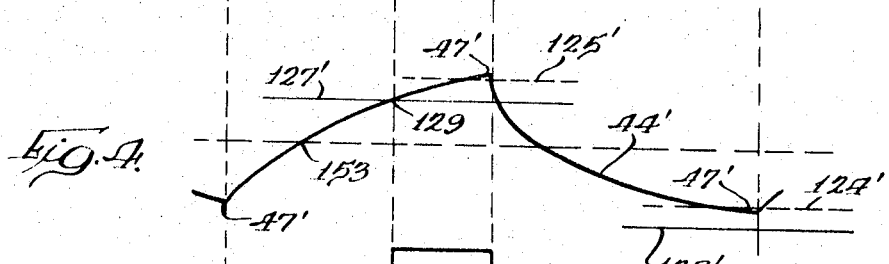

In order to monitor the instantaneous phase of the power waveform coupled to each of the SCR's, a driving means 43 for each phase of the source 10 is coupled to terminals 11. Each of the driving means 43 changes the power waveforms 17 into a driving waveform 44 which is available at an output line 45. The driving waveform 44' for driving means 43' is illustrated in FIGURE 4. Similar driving waveforms 44 (not illustrated) for each of the other two phases are developed by driving means 43" and 43''', and have the same phase relationship with respect to the power waveform coupled thereto as is shown in FIGURES 2 and 4 for the waveforms 17' and 44'. Waveforms 44 have an actuating or peak point 47 that occurs at the end of every half cycle of its respective power waveform 17.

Each of the pulse forming means 23 and 24 is responsive to the relative magnitudes of the driving waveform 44 and the bias output coupled thereto by either lines 36 or 39 to cause a pulse to be generated that precedes the occurrence of the peak point 47 of the driving waveform 44 by a time interval that is proportional to the magnitude bias, which in turn is proportional to the magnitude of the signal on line 29. This pulse actuates the SCR coupled thereto, passing a portion of the power waveform 17 to the armature 12 of the motor 13.

The potentiometers 35 and 38 may be adjusted to allow cross fire spikes to be passed to armature 12 in the absence of a signal on line 29. The magnitude of the cross fire spikes can be individually adjusted by the wiper arms 40 and 41 to provide an amount of power slightly less than that necessary to overcome friction for that particular motor 13 and the drive unit coupled thereto. This allows the motor to start to turn as soon as a control signal is received.

*Motor armature circuit*

In the circuit of FIGURE 1, source 10 comprises the secondary windings 50 of a three phase Y-connected power transformer. The common end of each of the windings 50 is connected to a reference or ground 51. The windings 50 may typically have 145 volts RMS potential between each of the terminals 11 and ground 51. Each of the terminals 11 is coupled through a fuse 53 to the pairs of reverse coupled SCR's 20 and 21. When actuated, an SCR conducts until the voltage across it reverses in a manner well known in the art. Thus, it is only necessary to gate the SCR with a pulse when the correct half cyle of power waveform 17 is coupled thereto.

In order to eliminate noise spikes that sometimes accompany the power waveform, thyrectors 55 are coupled across each of the pairs of forward and reverse poled SCR's. The thyrectors 55 will pass a current in either direction when the voltage thereacross reaches 420 volts peak, thereby clamping the noise spikes to prevent damage to the circuit.

The DC motor 13 is selected for a response characteristic suitable for its environment. The rating of the motor is desirably approximately four times the power necessary to overcome friction. When cross fire pulses equal to approximately 25 per cent of the rated current are gated to the motor, the armature will have a 180 cyle vibration but will not move. While the control circuit will be described for a bi-directional motor, the invention is equally applicable for controlling a unidirectional motor. In such an application, only the forward or the reverse control circuitry would be necessary.

For critical applications, as a machine tool, the "Minertia" motor of Yaskawa Electric Manufacturing Co., Ltd., of Japan, has proved satisfactory. The "Minertia" motor has a slotless-armature type rotor construction which allows the magnetic flux density in the air gap between the rotor and the stator to be more than twice that found in a slotted rotor type motor. The static magneic field may be provided by a permanent magnet, or by a field winding 57 coupled to a suitable source of DC potential (not illustrated).

The slotless rotor construction, having windings secured around the outside of the armature core by a synthetic resin, allows the rotor inertia to be greatly reduced because the rotor core volume can be decreased to less than half the size of a slotted core type rotor. Furthermore, the inductance is lowered to approximately one-tenth that of a slotted rotor. This allows a current of about ten times rated current to flow for a short duration of time through the windings, producing a maximum torque ten times larger than rated torque and about four times as large as that of a slotted rotor design.

*Error signal circuitry*

The error signal control circuit is a conventional unit with the addition of diodes whose function will be described hereinafter. An input signal which, e.g., indicates the desired instantaneous speed of the motor 13, is impressed across terminals 60 of circuit 28 by any conventional unit, as a recording machine. This signal is coupled to a tachometer 62 having an output connected with a tachometer forceing potentiometer 63, a 5 kilohm resistor 64, and a 1.0 microfarad capacitor 65 connected as illustrated in FIGURE 1. The tachometer circuit also has a feedback network comprising a 500 ohm resistor 67 and a feedback potentiometer 68. The above described circuit produces a control signal on line 69 having a polarity that indicates the desired direction of rotation, and a magnitude that indicates the difference between the desired and actual speed of rotation of armature 12. A pair of oppositely poled diodes 71 and 72 are coupled between line 69 and ground 51. These diodes have a 0.2 voltage drop thereacross when conducting. This insures that the input error signal to a differential operational amplifier 74 does not exceed a 0.2 volt magnitude.

A 10 kilohm resistor 75 and a 100 kilohm potentiometer 76, in shunt with a 1.0 microfarad capacitor 77 form a feedback network between the output and input of amplifier 74. A 2.2 kilohm resistor 78 is coupled from capacitor 77 to ground 51. Potentiometer 76 is a various gain control for amplifier 74, and with the representative values given will adjust the gain from five to fifty times the input signal.

A 22 kilohm resistor 80 and a 5 kilohm potentiometer 81 provide a balance control to insure a zero output signal when amplifier 74 has a zero input signal. The amplifier 74 is also coupled to a positive 83 and negative 84 source of DC potential. In the representative embodiment illustrated in FIGURE 1, source 83 is 15 volts positive and source 84 is 15 volts negative. The output of amplifier 74 is coupled through a 2.7 kilohm resistor 85 to line 29.

A pair of series connected diodes 88 and a pair of oppositely poled series connected diodes 89 are connected from line 29 to ground 51 across a 1.5 microfarad capacitor 90. Diodes 88 and 89 are silicon type 1N1696, each having a 0.6 voltage drop thereacross when conducting. These diodes insure that the signal coupled to follower means 31 has a maximum value of plus or minus 1.2 volts.

The operational amplifier 74, with its associated circuit including tachometer 62, provides a closed velocity loop used inside a position loop. The circuit can be modified to provide a rate control by changing the time constant of the amplifier feedback network. Any circuit that provides a control signal on line 29 having a polarity that indicates the desired direction of rotation for the motor and a magnitude that indicates the amount of current to be gated to the motor can be substituted for the circuit disclosed above.

*Motor control circuitry*

Figure 3:
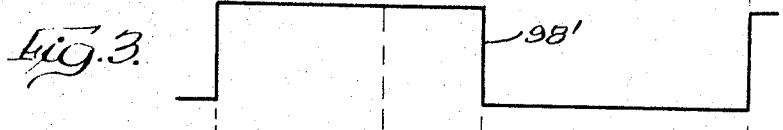

In order to determine the correct time for firing each SCR, driving means 43 are each coupled to one of the terminals 11 of source 10. Each driving means 43 couples the power waveform 17 through a 20 kilohm resistor 94 and across a pair of series connected diodes 95 and a similar pair of series connected diodes 96 poled in the opposite direction. Each diode has a 0.6 voltage drop thereacross when conducting, and may be a silicon type 1N1696. A generally square wave 98, illustrated in FIGURE 3 for one phase, is formed across the diodes, having a plus and minus 1.2 volt rise. It should be realized that wave 98' is illustrated greatly enlarged with respect to the power waveform 17' from which it was derived. By using the voltage drop across a rectifying diode, an extremely stable square wave is obtained whose value does not change even when the power waveform experience wide fluctuations in values. High frequency noise on the power line is eliminated. Similar square waves (not illustrated) are formed by the other driving means 43.

The square wave 98 is coupled to an integrator composed of one kilohm resistor 99 and 3.3 microfarad capacitor 100 for each phase of the power source. The generally ramp-shaped driving waveform 44, illustrated in FIGURE 4, is obtained on line 45 from the integrators. This waveform has a generally cosine wave shape that is the complement of the sine wave shape of power waveform 17. The peak point 47 of each of the ramp waveforms 44 has a maximum value of plus or minus 1.1 volts.

Each of the lines 45 is coupled to a driving input 102 and through a 2.7 kilohm resistor 103 to the base of a transistor in each of the forward and reverse pulse forming means 23 and 24.

In each of the forward pulse forming means 23, a PNP transistor 105, as a 2N1305, has its base 106 coupled to resistor 103. Similarly, an NPN transistor 108, as a 2N1304, has its base 109 coupled to registor 103 in each of the reverse pulse forming means 24. While only a single forward 23''' and reverse 24' pulse means has been illustrated in detail, it will be appreciated that all the forward 23 and all the reverse 24 pulse means have identical circuitry. The transistors 105 and 108 are preferably complementary, as illustrated, to simplify the control circuit. The bases 106 and 109 associated with each phase of source 10 are driven by the respective driving waveform 47 for that phase.

Turning now to the bias means 32 and 33, the parallel connected potentiometers 35 and 38 are seen to be each connected in a series circuit which includes a 1500 ohm resistor 111, a 68 ohm resistor 112, and a 10 ohm sensistor 113. Sensistors 113 have a plus 7.0 percent per degree centigrade temperature coefficient to compensate for the temperature effects of the germanium junctions of the transistors used in the control circuit.

Additional temperature compensation results from the combination of the silicon diodes in the clamp circuit 43 with germanium transistors in the pulse forming means 23, 24. For example, if the temperature rises, the clamp voltage decreases and the transistors conduct at a lower level. An inverse action takes place when the temperature drops.

A 47 ohm resistor 115 is coupled between the sensistors 113. Since the two series circuits are coupled between equal positive 83 and negative 84 potential sources, a current flows from terminal 83 and through resistor 115 to terminal 84. As a result, the mid-portion of resistor 115 corresponds to zero potential, i.e., ground. As viewed in FIGURE 1, the topmost portion of resistor 115 is approximately plus 0.3 volt, and the bottom portion of resistor 115 is approximately minus 0.3 volt.

Follower 31 is formed from an NPN transistor 116, as a 2N1304, and a PNP transistor 117, as a 2N1305. The transistors 116 and 117 are connected in an emitter follower type circuit. When no signal is present on line 29, each transistor normally conducts a small current since its respective emitter-base junction is forward biased 0.3 volt. In the absence of a signal on line 29, the wiper arms 40 and 41 of the potentiometers are adjusted to provide a minus 1.0 volt potential on lines 36 and a plus 1.0 volt potential on lines 39.

When, for example, a plus 1.0 volt potential exists one line 29, transistor 116 will conduct more current, causing the potential at each of the wiper arms 40 to go more positive from the minus 1.0 volt potential thereon. The transistor 117, however, will conduct less current, causing the potential at wiper arms 41 to go more positive with respect to the plus 1.0 volt potential thereon. Thus, the emitter follower 31 causes the bias output signals from both the forward 32 and reverse 33 bias means to change in the same direction as the input error signal. The bias output signals on the lines 36 and 39 change plus or minus 1.0 volt for a plus or minus 1.2 volt change in the error voltage. The individual bias potentiometers 40, 41 may be omitted in a single phase system.

A bias input 120 for each of the forward 23 and reverse 24 pulse forming means, having an individual 100 ohm resistor 121 connected to the emitters of each of the transistors 105 and 108 is coupled directly to the bias lines 36 and 39. A forward bias signal 124 from line 36, and a reverse bias signal 125 from line 39, seen in FIGURE 4 for one phase, is coupled to each emitter electrode. In the absence of an input signal, the bias signals 124 and 125 are adjusted, as previously described, to have 1.0 volt magnitude. The peak point 47 of the driving waveform 44 is at a 1.1 volts magnitude. Therefore, the emitter-base junctions of the transistors 105 and 108 are normally back biased until the peak point 47 of the driving waveform 44 coupled thereto crosses the bias levels similarly coupled thereto. At this point, the transistor will conduct, producing cross fire spikes in the motor armature circuit. The exact manner in which the SCR's are gated will, however, first be described in conjunction with the presence of a control signal.

By way of example, it will be assumed that a negative signal is present on line 29. The follower means 31 will cause the bias levels from both the forward 32 and reverse 33 bias means to go more negative. As seen in FIGURE 4, the reverse bias signal 125 will go more negative to level 127'. Similarly, the forward bias signal 124' will go more negative to a level 128'. junction of transistor 108' until driving waveform 44' crosses the level of bias 127' at point 129. At this time, transistor 108' will conduct current to generate a pulse. It is also observed that bias 128' always back biases the emitter-base junction of the forward transistors 105. Thus, the presence of a negative signal, indicating a desired reverse direction of rotation, prevents the forward pulse forming means 23 from conducting.

The collector of each of the transistors 105 and 108 are coupled through 5.6 kilohm resistors 130 to a source of potential, and to the base of NPN transistors 131 and PNP transistors 132, respectively. The collectors of transistors 131 and 132 are coupled through a 2.7 kilohm resistor 133 to ground 51. A feedback network consisting of a 56 kilohm resistor 135 and a 0.018 microfarad capacitor 136 couples the ungrounded side of resistors 133 back to the base of the first transistors. A noise suppression 0.018 microfarad capacitor 37 is connected in series between the resistors 121 and 133.

Figure 5:
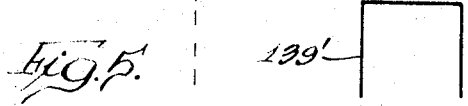
Figure 6:
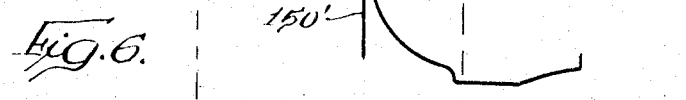

As transistor 108' begins to conduct, at point 129 in FIGURE 4, transistor 132' similarly conducts, and RC feedback networks 135' and 136' quickly switches the two transistors into a conducting state. As a result, a pulse 139', as seen in FIGURE 5, is developed across resistor 133'.

Each of the resistors 133 in both the forward 23 and reverse 24 pulse forming means is coupled to a PNP transistor 142 and NPN transistor 143, respectively. The collector of transistors 142 and 143 is coupled through a parallel 470 ohm resistor 145 and a 0.47 microfarad capacitor 146 to a pulse transformer 147. The output of pulse transformer 147 is coupled across a 150 ohm resistor 148 and through the terminals 26 and 27 to the gate and cathode electrodes of the SCR's 20 and 21. Diode 149 clips the negative trailing half of the pulse.

The pulse 139' will cause current to pass through transistor 143', thereby producing a pulse 150' across the output of the pulse transformer 147', at terminal 27'. Pulse 150' drives SCR 21' into its conducting state. As a result, the waveform 17' that is at that instant coupled to SCR 21' will be gated to the motor armature 12. The waveform 17' which is passed through SCR 21' at the time of crossing 129 can be seen as the shaded portion of wave 17' in FIGURE 2. As wave 17' crosses the zero axis 151 at 152, SCR 21' will cease to conduct current. Thus, a pulse (shaded portion of 17') having a power proportional to the magnitude of the control signal at 29 is passed in the correct direction to the motor armature 12.

The RC combination of second transistors 131 and 132 is chosen to have a higher frequency response than the RC combination across the operational amplifier 74. This prevents "fault" current from flowing through two oppositely poled SCR's which would otherwise be simultaneously gated when the input error signal quickly changes polarity.

The bias output signals 127 and 128 have an "on" and an "off" range of magnitudes. Whenver the bias level does not cross the driving waveform, e.g., level 128' in FIGURE 4, the bias is in its "off" range. Similarly, whenever the bias level crosses the driving waveform, e.g., levels 124', 125', and 127' in FIGURE 4, the bias level is in its "on" range.

A full range of bias values from zero volts to plus or minus 2.0 volts is possible. In connection with bias 127', for example, this range of values will cause pulse 139' to be generated at any point between the peak point 47' and the crossing of the zero axis at 153. This respectively corresponds to firing the SCR when the power waveform coupled thereto is between zero degrees and approximately 150° preceding the occurrence of the peak point 47 of the driving waveform. The dashed line 154 on FIGURE 2, which precedes point 152 by 150°, represents the maximum conduction possible for one SCR. At this time, waveform 17''' becomes more negative than waveform 17', causing the preceding SCR 27''' to cease conduction and allowing the next SCR 27' to begin conduction.

It should be noted that as the SCR's are fired throughout a range from 120° to 150° preceding peak point 47, each SCR may conduct for 120°, the maximum possible conduction duration. However, this duration time occurs at different points on the waveform as the firing angle varies. For example, with the SCR's fired at 120° preceding point 47, each SCR conducts from 120° preceding zero degrees to zero degrees. With the SCR's fired at 150° preceding point 47, each SCR conducts from 150° preceding zero degrees to 30 degrees preceding zero degrees, i.e., the cross-over point of two of the power waveforms. The nature of the load will also affect the duration of the conduction period. For example, with a motor load the back EMF which is developed opposes the source voltage and tends to cause the SCR's to cease conduction before the cross-over point is reached.

The driving waveform 44 has a generally cosine shape which is the complement of the sine wave shape of its respective power waveform 17. Due to this special shape, a linear change in the bias level, which in turn is caused by a linear change in the control signal, will gate a corresponding linear amount of power to the motor. This desirable feature allows a DC motor to be accurately controlled by the control signal.

Figure 7:
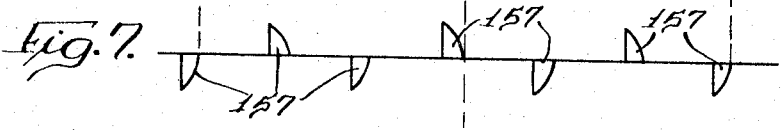

In the absence of a control signal, as shown by bias levels 124' and 125', in FIGURE 4, a pulse 139 will be generated in the forward 23 and reverse 24 pulse forming means for each half cycle of each driving waveform. These pulses will gate each SCR for a small conduction angle, as 15° preceding the end of each half cycle, producing cross fire spikes 157, seen in FIGURE 7. The average DC value of the series of positive and negative power spikes 157 is zero. Each power spike has slightly less power than that necessary to have the motor 13 overcome friction, as previously explained. When a control signal is received, the motor shaft will immediately begin to rotate in the correct direction. By adjusting the potentiometers 35 and 38, the dead band for an individual motor is practically eliminated.

With the motor control circuit disclosed, armature 12 can be accurately rotated to a new position which is only 0.0015 of a revolution from its original starting position.

Modifications of FIGURE 1

Figure 8:
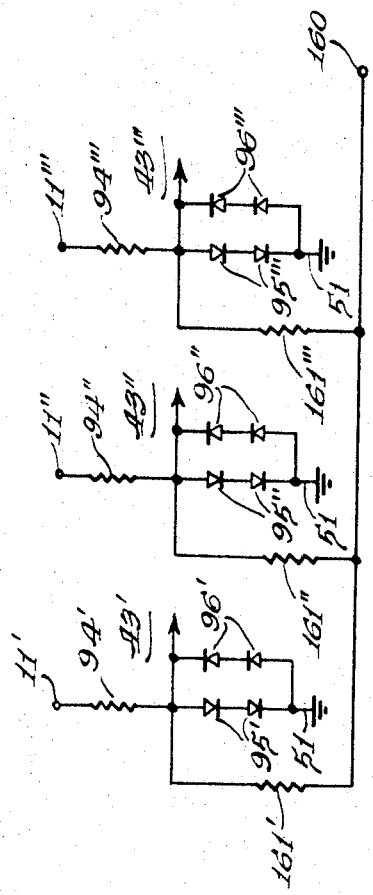
FIGURE 8 is a schematic diagram of a modification of FIGURE 1 to produce smooth deceleration of the DC motor.

The back EMF generated in motor 13 hinders smooth deceleration as the magnitude of the error signal decreases. A modification of FIGURE 1 shown in FIGURE 8 aids the brake action of the motor. The diodes 95 and 96, and resistors 94 are the portion of the driving means 43 which forms the square waves 98. A source of DC voltage 160 is coupled through resistors 161 to each of the diodes 95 and 96. Source 160 has a positive or negative voltage which is opposite to the voltage in the motor armature. This voltage from source 160 biases either diodes 95 or 96 into conduction, thereby changing the portion of the power waveform 17 from terminals 11 that will be converted in to a square wave. This in effect shifts the square wave, which in turn retards the firing angle of the SCR's that are conducting when brake action is required. Any source 160 which has a DC voltage proportional to the back EMF generated by the armature is suitably for this purpose. For example, the voltage from the tachometer 62 in FIGURE 1 may be used.

Figure 9:
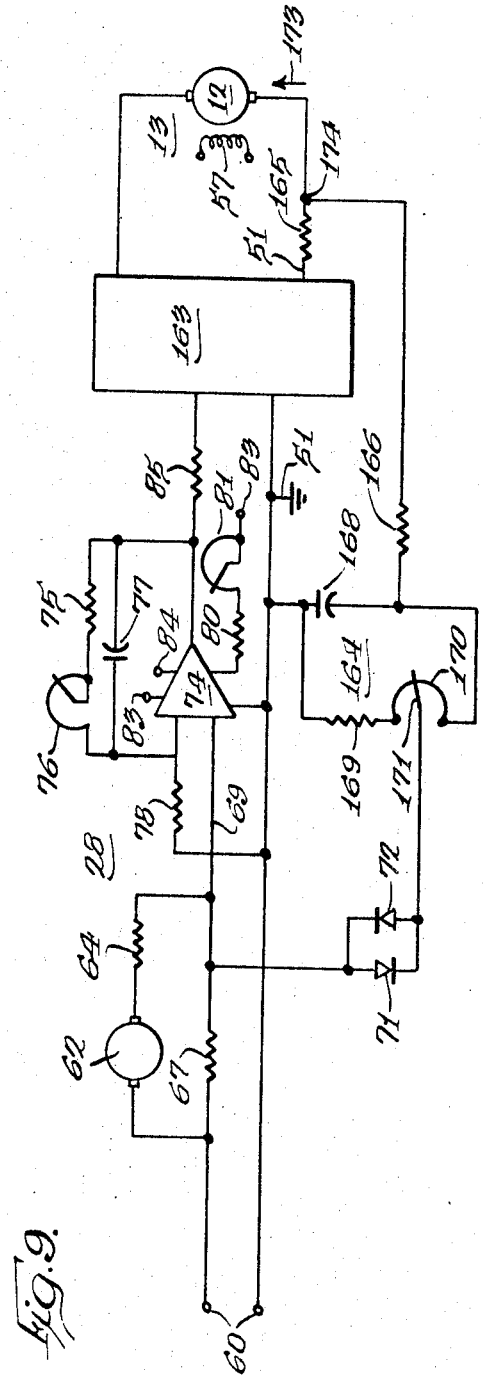
FIGURE 9 is a schematic diagram of another modification of FIGURE 1 providing a network for automatically controlling the maximum current flow through the DC motor armature.

Another modification of FIGURE 1, illustrated in FIGURE 9, provides an automatic clamping circuit for limiting the current through the motor armature 12 to any predetermined value. The block 163 represents the complete motor control circuitry and motor armature circuitry of FIGURE 1. For simplification, the potentiometers associated with tachometer 62 have been eliminated.

For a specific DC motor, it may be desirable to limit the instantaneous armature current to, for example, a maximum of 400 percent of rated current. For this purpose, the diodes 71 and 72 are disconnected from ground 51 and connected to an adjustable voltage network 164. Network 164 includes a low resistance resistor 165 that develops 0.4 volt when 400 percent of rated current flows through armature 12. This voltage is coupled through a 100 ohm resistor 166 to a parallel combination of a 500 microfarad capacitor 168 and a series connected 50 ohm resistor 169 and 50 ohm potentiometer 170. The connection between capacitor 168 and resistor 169 is coupled to ground 51.

A wiper 171 on potentiometer 170 is adjusted to have an absolute value of 0.2 volt thereon for a 0.4 volt signal from resistor 165. The polarity of the voltage on wiper 171 is exactly opposite to the polarity of the signal across terminal 60. For example, assuming a positive voltage on terminal 60 coupled to resistor 67, a "forward" current flows through motor 12 in the direction of the arrow 173, as was explained in conjunction with FIGURE 1. This current generates a negative voltage at point 174, producing a minus 0.2 volt potential on wiper 171. The minus 0.2 volt cancels the plus 0.2 volt drop across conducting diode 71, resulting in a 0.0 volt signal between line 69 and ground 51. Thus, as the current flow approaches the maximum limit set by potentiometer 170, the input to operational amplifier 74 will go to zero, thereby retarding the firing angle for the SCR's and decreasing the current to armature 12. The adjustable voltage network 164 therefore provides a negative feedback control for limiting the maximum current flow to any desired value.

We claim:

1. A control circuit for a load, comprising: a source of three phase AC power having three terminals, each terminal having energy with a power waveform displaced 120° from the power waveforms at the other terminals; pulse actuated gating means coupled between each terminal and said load for passing a portion of the power waveform coupled thereto; a source of signal having a magnitude that indicates the amount of current to be gated to said load; control means coupled between said source of signal and said gating means, operative to generate for each phase a pulse that occurs near the end of a half cycle of the corresponding power waveform to actuate the gating means in the absence of said signal to produce cross fire, said control means being further operative to generate for each phase a pulse that actuates said gating means when said signal is present and to vary the occurrence of said last named pulse between occurrences of predetermined points on the power waveform in proportion to the magnitude of said signal for controlling the current to said load.

2. A control circuit for a load, comprising: a source of three phase AC power having three terminals, each terminal having energy with a power waveform displaced 120° from the power waveforms at the other terminals; pulse actuated gating means coupled to each terminal for passing a maximum of approximately 120° of the power waveform coupled thereto; means coupling the load across said gating means and said terminals; driving means coupled to each of said terminals for changing the power waveform coupled thereto into a driving waveform having an actuating portion at the end of a half cycle of said power waveform; pulse forming means having a driving input and a bias input, and having outputs coupled to each gating means; means coupling each of said driving means to the driving input of said pulse forming means; bias means having a bias output coupled to the bias input of said pulse forming means; a source of signal having a magnitude that indicates the amount of current to be gated to said load; actuating means including said driving means and bias means, coupled to said source of signal for causing said pulse forming means to generate for each phase a pulse that occurs near the actuating portion of the corresponding driving waveform, in the absence of said signal, thereby actuating said gating means to produce cross fire, said actuating means being further operative to adjust the relation between the bias output and the driving waveforms to generate for each phase a pulse that precedes the occurrence of the actuating portion of the driving waveform coupled thereto by an amount up to a maximum of approximately 120° that is proportional to the magnitude of said signal, actuating said gating means for controlling the current to said load.

3. A control circuit for a load, comprising: a source of three phase AC power having three terminals, each terminal having energy with a power waveform displaced 120° from the power waveforms at the other terminals; gating means coupled to each terminal for passing a maximum of approximately 120° of the power waveform coupled thereto, including pulse actuated unidirectional conduction means poled to pass current in both a forward and a reverse direction; means coupling the load across said gating means and said terminals; driving means coupled to each of said terminals for changing the power waveform coupled thereto into a driving waveform having an actuating portion at the end of a half cycle of said power waveform; forward and reverse pulse forming means having a driving input and a bias input, and having outputs coupled respectively to the forward and reverse poled unidirectional conductions means of each gating means; means coupling each of said driving means to the driving input of each of said pulse forming means; a source of signal having a polarity and magnitude that indicates the direction and amount of current to be gated to said load; forward and reverse bias means, coupled respectively to the bias input of said forward and reverse pulse forming means, having bias outputs that cause both said forward and reverse pulse forming means to generate pulses that occur near the actuating portion of each driving waveform coupled thereto in the absence of said signals, thereby actuating said gating means to produce cross fire; follower means coupled to said source of signals, operative to adjust the magnitude of the bias output of said bias means to cause one of said forward and reverse pulse forming means to generate for each phase a pulse that precedes the occurrence of the actuating portion of the corresponding driving waveform by an amount that is proportional to the magnitude of said signal, and further operative to prevent cross fire from being generated in the other of said forward and reverse pulse forming means, thereby actuating said gating means for controlling the current to said load.

4. The control circuit of claim 3 wherein said driving means includes means for changing the power waveform coupled thereto into a driving waveform that is the complement of the power waveform, providing a linear relation between the magnitude of said signal and the portion of the power waveform passed to said load by said gating means.

5. The control circuit of claim 4 wherein said driving means includes squaring means for changing the power waveform coupled thereto into an essentially square waveform, and integrating means coupled to said squaring means for changing said essentially square waveform into a driving waveform that is the complement of the power waveform and includes a peak portion at the end of the half cycle of said power waveform.

6. The control circuit of claim 5 in which said squaring means comprises diodes poled to pass current in both directions, said squaring waveform corresponding to the voltage drop across said diodes and having a magnitude that is a small fraction of the magnitude of the power waveforms.

7. A control circuit for a load, comprising: a source of three phase AC power having three terminals, each terminal having energy with a power waveform displaced 120° from the power waveforms at the other terminals; gating means coupled to each terminal for passing a maximum of approximately 120° of the power waveform coupled thereto, including pulse actuated unidirectional conduction means poled to pass current in both a forward and a reverse direction; means coupling the load across said gating means and said terminals; driving means coupled to each of said terminals for changing the power waveform coupled thereto into a driving waveform having a peak portion at the end of a half cycle of said power waveform; forward and reverse pulse forming means having a driving input and a bias input, and having outputs coupled respectively to the forward and reverse poled unidirectional conduction means of each gating means; means coupling each of said driving means to the driving input of each of said pulse forming means; a source of signal having a polarity and rent to be gated to said load; forward and reverse bias means coupled respectively to the bias inputs of said forward and reverse pulse forming means, having bias outputs adjustable throughout an "off" range of magnitudes for preventing said pulse forming means from generating pulses and an "on" range of magnitudes for causing a pulse to be generated for each phase by said pulse forming means that precedes the occurrence of the peak portion of the driving waveform by a time interval that is proportional to the magnitude of the bias, thereby actuating said gating means and passing a portion of the power waveform to the load, said portion being proportional to said time interval and having a maximum value of approximately 120°, means adjusting said forward and reverse bias means in the "on" range to cause both said forward and reverse pulse forming means to generate for each phase a pulse that occurs near the peak portion of the corresponding driving waveform in the absence of said signal, thereby actuating said gating means to produce cross fire; follower means coupling said source of signal to said bias means, operative to adjust the magnitude of the bias output coupled to one of said forward and reverse pulse forming means to a value in the "on" range that is proportional to the magnitude of said signal, and further operative to adjust the bias output coupled to the other of said forward and reverse pulse forming means to a value in the "off" range, thereby passing portions of power waveforms in only one of said directions from each of the terminals to said load when said signals are present.

8. A control circuit for a load, comprising: a source of three phase AC power having three terminals, each terminal having energy with a power waveform displaced 120° from the power waveforms at the other terminals; gating means coupled to each terminal for passing a maximum of approximately 120° of the power waveform coupled thereto, including pulse actuated unidirectional conduction means poled to pass current in a forward and a reverse direction; means coupling the load across said gating means and said terminals; driving means coupled to each of said terminals for changing the power waveform coupled thereto into a driving waveform having an actuating portion at the end of a half cycle of said power waveform; a forward and reverse pulse forming means for each gating means, each pulse forming means having a driving input, a bias input, and an output coupled to one of the unidirectional conduction means, said pulse forming means including a transistor having collector, base control, and emitter control electrodes, means connecting said collector electrode to a source of potential, means conecting one of said control electrodes to said driving input and the other of said control electrodes to said bias input; means coupling each of said driving means to the driving input of each of said pulse forming means; bias means having bias outputs coupled respectively to the bias inputs of said pulse forming means; a source of signal having a polarity and magnitude that indicates the direction and amount of current to be gated to said load; actuating means including said driving means and said bias means, coupled to said source of signal for adjusting the relation between the magnitude of the bias output and the driving waveform coupled to the control electrodes of each pulse forming means throughout an "off" and an "on" range of values, said "off" range back-biasing and the emitter-base junction of the transistors in one of said forward and reverse pulse forming means to prevent the generation of a pulse when said signal is present, said "on" range forward-biasing the emitter-base junction of the transistors in the other of said forward and reverse pulse forming means to cause a pulse to be generated that precedes the occurrence of the actuating portion of the driving waveform coupled thereto by a time interval that is proportional to the magnitude of said signal, actuating the unidirectional gating means coupled thereto to allow a portion of the power waveform proportional to said time interval and having a maximum vale of approximately 120° to be passed to said load.

9. A control circuit for a load, comprising: a source of three phase AC power having three terminals, each terminal having energy with a power waveform displaced 120° from the power waveform at the other terminals; gating means coupled to each terminal for passing a maximum of approximately 120° of the power waveform coupled thereto, including pulse actuated unidirectional conduction means poled to pass current in a forward and a reverse direction; means coupling the load across said gating means and said terminal; driving means coupled to each of said terminals for changing the power waveform coupled thereto into a driving waveform having an actuating portion at the end of a half cycle of said power waveform; forward and reverse pulse forming means having a driving input and a bias input, and having outputs coupled respectively to the forward and reverse poled unidirectional conduction means of each gating means; means coupling each of said driving means to the driving input of each of said pulse forming means; forward and reverse bias means, coupled respectively to the bias inputs of said forward and reverse pulse forming means, having bias outputs adjustable throughout an "off" range of magnitudes for preventing said pulse forming means from generating pulses and an "on" range of magnitude for causing said pulse forming means to generate a pulse for each phase which precedes the occurrence of the actuating portion of the corresponding driving waveform by a time interval that is proportional to the magnitude of the bias, thereby actuating the unidirectional conduction means coupled thereto, passing to said load a portion of the power waveform proportional to said time interval and having a maximum value of approximately 120°; a source of signal having a polarity and magnitude that indicates the direction and amount of current to be gated to said load; means coupled to said source of signal for causing the bias outputs of one of said forward and reverse bias means to assume said "off" range when said signal is present, and further causing the bias outputs of the other of said bias means to assume a magnitude in the "on" range that is proportional to the magnitude of said signal.

10. A control circuit for a load, comprising: a source of three phase AC power having three power terminals, each power terminal having energy with a power waveform displaced 120° from the power waveforms on the other power terminals; gating means coupled between each power terminal and said load for passing a maximum of approximately 120° of the power waveform coupled thereto, comprising a pair of oppositely poled SCR's having pulse actuated gating terminals; driving means for each of said power terminals, having an input terminal coupled to one of said power terminals and a driving output terminal, diode means coupled to said input terminal and having a voltage drop thereacross, integrating means coupled between said diode means and said driving output terminal for integrating said voltage drop to produce a driving waveform complementary to the power waveform and having a peak portion at the end of a half cycle of said power waveform; a forward and a reverse pulse forming means for each driving means, said pulse forming means having a bias input, and a pulse output coupled to the gating terminals of one of the SCR's, said pulse forming means including a transistor having collector, base, and emitter electrodes, means connecting the collector electrode to a source of potential, means connecting the base electrode to the driving output terminal of the corresponding driving means, and means connecting the emitter electrode to the bias input; forward and reverse bias means coupled respectively to the bias inputs of said forward and reverse pulse forming means, having bias output signals adjustable throughout an "off" and "on" range of magnitudes, said "off" range having an adjustable magnitude exceeding the magnitude of said peak portion of the driving waveform, thereby back-biasing the emitter-base junction of the transistors for preventing the generation of pulses, said "on" range having an adjustable magnitude less than the magnitude of said peak portion of the driving waveform, thereby forward-biasing the emitter-base junction of the transistors to cause a pulse to be generated, said magnitude being adjustable to linearly vary the occurrence of the pulse between the occurrence of said peak portion and the occurrence of a portion preceding said peak portion by approximately 120°; a source of signal having a polarity and magnitude that indicates the direction and amount of current to be gated to said load; follower means connected between said source of signal and said bias means for causing the bias output signals of one of said forward and reverse bias means to assume said "off" range when said signal is present with one polarity, and further causing the bias output signals of the other of said bias means to assume a magnitude in the "on" range that is proportional to the magnitude of said signal, thereby gating a portion up to approximately 120° of the power waveform to said load.

11. The control circuit of claim 10 wherein said forward and reverse bias means includes a circuit having individual variable resistors for each SCR; a source of potential coupled across said circuit for causing a current to flow through said variable resistors, said bias output signal corresponding to the potential at each of said variable resistors; and follower means coupled to said circuit and having a control terminal connected with said source of signals for varying the current through said circuit in proportion to the magnitude of said signal, thereby varying the potential of said bias outputs.

12. A control circuit for a load, comprising: a source of three phase AC power having three terminals, each terminal having energy with a power waveform displaced 120° from the power waveforms at the other terminals; pulse actuated gating means coupled between each terminal and said load for passing a portion of the power waveform coupled thereto; a source of signal having a magnitude that indicates the amount of current to be gated to said load; driving means, coupled to each of said power terminals, having oppositely poled diode means coupled across said power waveforms for producing a generally square wave shaped voltage thereacross that is a small fraction of the magnitude of the power waveform coupled thereto, integrating means coupled to said diode means for integrating said voltage to produce a driving waveform having an actuating portion at the end of a half cycle of said waveforms; control means including said driving means coupled between said source of signal and said gating means, operative to generate for each phase a pulse coupled to said gating means, and further operative to vary the occurrence of the pulse between the occurrences of said actuating portion and a predetermined point preceding said actuating portion in proportion to the magnitude of said signal, said pulse actuating the gating means to which it is coupled for controlling the current to said load.

13. The control circuit of claim 12 wherein said diode means includes first semiconductor junctions having a predetermined voltage drop change for changing temperatures, said control means includnig a transistor trigger circuit using second semiconductor junctions which have the same direction voltage drop change for changing temperatures as said first semiconductor junctions, thereby causing said trigger circuit to generate pulses at the same time with relation to said actuating portion of said waveform regardless of changes in temperature.

14. A control circuit for a load, comprising:
a source of AC power waveform;
gating means coupled between said source and said load for passing a portion of the power waveform coupled thereto;
a source of input signal which indicates the portion of the power waveform which is to be gated by said gating means to said load;
means coupled to said AC source for developing a nonsymmetrical driving waveform having a generally rampshape and a fixed phase relation to said power waveform;
means to vary the time of actuation of said gating means in proportion to the amplitude of said input signal relative to the amplitude of said driving waveform, wherein said AC power waveform is a sine wave, said nonsymmetrical means causing said driving waveform to have a cosine phase relation to the AC power waveform whereby the amount of AC power passed by said gating means is lineraly proportional to the amplitude of said input signal.

15. A control circuit for a load comprising:
a source of AC power waveform;
gating means coupled between said source and said load for passing a portion of the power waveform coupled thereto;
a source of input signal which indicates the portion of the power waveform which is to be gated by said gating means to said load;
means coupled to said AC source for developing a nonsymmetrical driving waveform having a generally rampshape and a fixed phase relation to said power waveform;
means to vary the time of actuation of said gating means in proportion to the amplitude of said input signal relative to the amplitude of said driving waveform, wherein said nonsymmetrical means includes:
means coupled to said AC power source for developing a reference signal that is a small fraction of the amplitude of the power waveform and has a fixed phase relation to the power waveform, and
means for integrating said reference signal to generate said ramp-shaped driving waveform having a curve terminating in a peak portion occurring in time at the end of a half cycle of the power waveform.

16. The control circuit of claim 15 wherein said integrating means causes said ramp to have a generally cosine phase relation to the AC power waveform and extending from the peak portion to a point preceding said peak portion by at least 120°.

17. The control circuit of claim 15 wherein said peak portion terminates in a generally discontinuous curve.

18. The control circuit of claim 15 wherein said reference signal developing means includes diode means coupled across said power source and having a forward voltage drop which establishes a clipped, generally square wave signal corresponding to said reference signal.

19. A control circuit for a load, comprising:
a source of AC power waveform;
gating means coupled between said source and said load for passing a portion of the power waveform coupled thereto;
a source of input signal which indicats the portion of the power waveform which is to be gated by said gating means to said load;
means coupled to said AC source for developing a nonsymmetrical driving waveform having a generally ramp-shape and a fixed phase relation to said power waveform;
means to vary the time of actuation of said gating means in proportion to the amplitude of said input signal relative to the amplitude of said driving waveform,
said AC power source having AC power waveforms each displaced 120° from the remaining power waveforms, including a plurality of nonsymmetrical means each coupled to a different AC power waveform for developing a plurality of nonsymmetrical driving waveforms each having a fixed phase relation with respect to the AC waveform corresponding thereto, each nonsymmetrical means including means for shaping said driving waveform to produce a peak portion at the end of the half cycle of the AC power waveform corresponding thereto and a variable amplitude ramp portion preceding said peak portion for approximately 150° of the power waveform.

References Cited

UNITED STATES PATENTS

| | | | |
|---|---|---|---|
| 2,239,289 | 4/1941 | Goodhue et al. | 321—16 X |
| 3,332,008 | 7/1967 | Mueller et al. | 321—16 X |
| 3,351,838 | 11/1967 | Hunter | 321—5 |

OTHER REFERENCES

General Electric Silicon Controlled Rectifier Manual, 2nd edition, "Full Wave DC Motor Drives," pp. 123, 124.

JOHN F. COUCH, *Primary Examiner.*

W. H. BEHA, JR., *Assistant Examiner.*

U.S. Cl. X.R.

307—297; 318—331, 293, 448; 321—11